United States Patent
Grundberg

[15] 3,639,826
[45] Feb. 1, 1972

[54] ELECTRONIC CONTROL CIRCUIT

[72] Inventor: Kenneth Grundberg, 3012 Maplewood, Royal Oak, Mich. 48073

[22] Filed: Mar. 12, 1970

[21] Appl. No.: 18,010

Related U.S. Application Data

[63] Continuation-in-part of Ser. No. 701,384, Jan. 29, 1968, abandoned.

[52] U.S. Cl.............................321/2, 315/209 CD, 315/241, 321/18
[51] Int. Cl.............................................H02m 3/32, H05b
[58] Field of Search..............................321/2, 18; 331/112; 315/209 CD, 241; 123/148 E

[56] References Cited

UNITED STATES PATENTS 3,417,306  12/1968  Knak..........................321/2 X
3,421,069  1/1969  Minks.........................321/2
3,435,320  3/1969  Lee et al.....................321/2

Primary Examiner—William H. Beha, Jr.
Attorney—Whittemore, Hulbert & Belknap

[57] ABSTRACT

An electronic control circuit for providing an output signal for missile firing or the like comprising a source of oscillating electrical energy, structure for storing a predetermined amount of electrical energy, an electrical reactance for transferring the oscillating electrical energy into the storage structure, means for limiting the electrical charge stored in the storage structure and for indicating the storage structure is charged, trigger structure for providing a controlled discharge of the stored energy to provide the output signal, and means for shutting off the source of alternating electrical energy during discharge of the storage means.

6 Claims, 6 Drawing Figures 3,639,826

INVENTOR
KENNETH GRUNDBERG

BY Hulbert & Belknap

ATTORNEYS

INVENTOR
KENNETH GRUNDBERG

BY *Whittimore, Hulbert & Belknap*

ATTORNEYS

ELECTRONIC CONTROL CIRCUIT

CROSS-REFERENCE TO RELATED APPLICATIONS

The present application is a continuation-in-part of patent application Ser. No. 701,384, filed Jan. 29, 1968, which application is now abandoned.

BACKGROUND OF THE INVENTION

1. Field of the Invention

The invention relates to means for and a method of providing electrical output signals which may be control signals or only regulated, converted or inverted signals. More specifically the invention refers to a control circuit for and method of providing controlled electrical pulse output signals for engine ignition or missile firing or the like.

2. Description of the Prior Art

In the past, circuit for providing electrical pulse output signals for igniting turbine engines and regulated, converted or inverted output signals or the like have been deficient in the efficiency with which energy has been developed, stored and/or dissipated through the load. Thus, electromagnetic and electrohydraulic systems have been used in the past to provide energy for or for transferring energy to a storage device and/or for subsequently discharging the energy through a load with resultant low efficiency in energy transformation.

In addition, in firing missiles such as grenades and the like, it is desirable to have a means for and method of producing a pulse of electrical energy of positively known magnitude on command and to be assured at the time of command that the required energy is available. With prior control circuits, an electrical signal at a predetermined voltage level together with an indication of the correct voltage level has not been available in a reasonably compact, reliable, inexpensive form.

SUMMARY OF THE INVENTION

The invention therefore includes the provision of a control circuit for and a method of providing electrical output signals for ignition of turbine engines or control of firing of missiles or the like which is simple, economical and efficient.

The control circuit of the invention includes an oscillator for developing electrical pulses, means for storing the electrical pulses and for periodically discharging the electrical pulses across a load at low or high voltage. Optional means for regulating the oscillator may be included in the control circuit in accordance with the invention. In the control circuit of the invention transformer means are provided for transfer of electrical energy from the oscillator to the storage device whereby the transfer is particularly efficient.

In addition, the control circuit of the invention may include means for maintaining the signal on the storage means at a predetermined level before discharge together with means for indicating the voltage at the predetermined level and for providing discharge from the storage means only on command. Also, the control circuit includes means for cutting off the oscillator during discharge of the storage means.

In one modification of the invention a circuit is disclosed for providing a converted alternating to direct current, regulated or inverted output signal at a level either above or below the level of the input signal at a theoretical 100 percent efficiency over a wide range of supply voltages and loads.

The method of providing the electrical output signals in accordance with the invention includes developing electrical oscillations, storing the electrical energy derived from the oscillations and discharging the stored electrical energy through a load. The electrical energy may be discharged through the load continuously at predetermined uniform intervals or only on command. As indicated above, the stored energy may be indicated when the energy is to be discharged on command and the method of providing electrical output signals may include the steps of stopping the development of electrical oscillations during discharge of the storage device and charging or discharging the storage device in accordance with the voltage level of the electrical energy stored therein.

DESCRIPTION OF THE PREFERRED EMBODIMENTS

Figure 1:
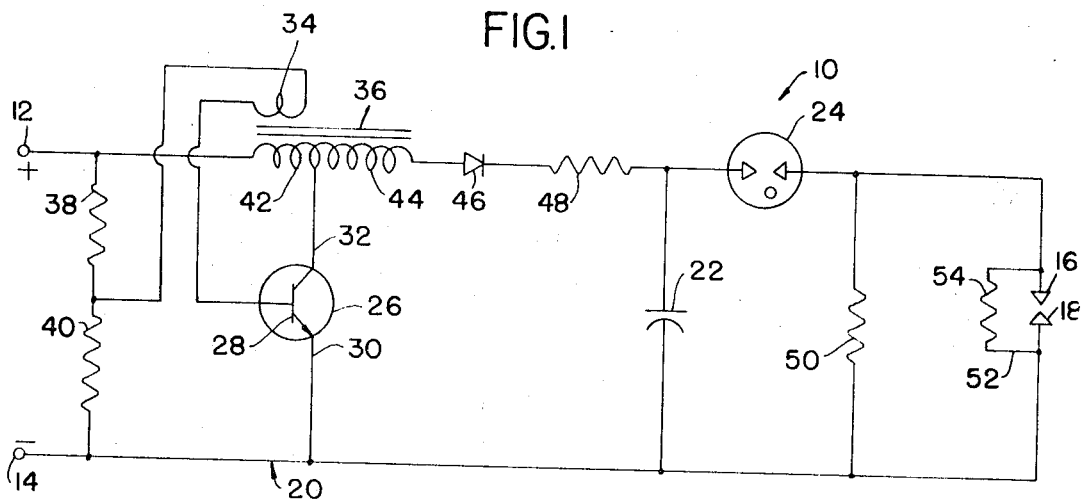
FIG. 1 is a schematic diagram of an electrical control circuit constructed in accordance with the invention particularly suited for engine ignition use.

The electronic control circuit 10 illustrated in FIG. 1 may be connected to a plurality of different sources of electrical energy across the terminals 12 and 14 including, for example, a direct current source or alternating current sources of varied frequency of, for example, up to 30 volts and will produce an output pulse across the electrodes 16 and 18 of the airgap igniter 52 at relatively low voltage and at a frequency determined by the magnitude of the input voltage, the frequency of the oscillator circuit 20, the magnitude of the capacitor storage device 22 and the breakdown voltage of the spark gap structure 24.

More specifically, the oscillator circuit 20 includes the transistor 26 having the base 28, emitter 30 and collector 32, as shown in FIG. 1. The base 28 of the oscillator semiconductor 26 is connected through a secondary portion 34 of the electrical reactance transformer 36 to a central point of the voltage divider including the resistors 38 and 40 connected across the electric terminals 12 and 14. The emitter 30 of the transistor 26, as shown, is connected to the terminal 14, while the collector of the transistor 26 is connected to the terminal 12 through the primary portion 42 of the transformer 36.

Additionally, the secondary portion 44 of the transformer 36 is connected through the rectifying diode 46 and resistance 48, while resistance is not necessary to the operation of the circuit 10, to one side of the capacitor storage device 22. The other side of the capacitor storage device 22 is connected to the terminal 14.

A protecting resistor 50 is provided across the airgap igniter 52 which includes the resistance 54 in addition to the terminals 16 and 18 to provide a load for the circuit 10 with the airgap igniter removed. The airgap igniter 52 may, for example, be a spark plug in which case the resistance 54 may not be a physical resistor.

In overall operation of the electronic control circuit 10, when the circuit 10 is connected across a source of electrical energy at the terminals 12 and 14, a voltage appears across the resistor 40 of the voltage divider to provide a forward bias on the oscillator transistor 26 to produce electrical oscillations. The oscillator transistor 26 will conduct through the primary portion 42 of the transformer 36 to induce a signal in the secondary portion 34 of the transformer 36 in opposition to the bias applied to the base of transistor 26 due to the signal applied across terminals 12 and 14. The induced signal will cause the transistor 26 to stop conducting.

When the transistor 26 is cut off, the current through the primary portion 42 of the transformer 36 ceases and the field therearound collapses to produce a signal in the secondary portion 44 of transformer 36, a portion of which is transferred through the diode 46 and resistance 48 and is stored on the capacitor 22. The cycle of the oscillator circuit 20 is thus completed and will be repeated as long as the source of electrical energy is connected to the terminals 12 and 14 with additional energy being transferred to the capacitor 22 up to the limit set by the spark gap structure 24.

After a number of cycles of the oscillator 26, the signal stored on the capacitor 22, which it is pointed out is transferred to the capacitor 22 from the oscillator 26 with a theoretical 100 percent efficiency due to the transformer transfer arrangement provided, will be of a magnitude to cause the spark gap structure 24 to become conductively ionized. The voltage stored in the capacitor 22 will on breakdown of the spark gap structure 24 rapidly discharge through the electrodes 16 and 18 of the igniter 52 to, for example, ignite a turbine engine. After discharge of the capacitor 22, the spark gap structure 24 will open and the complete cycle of operation of the electronic control circuit 10 will be repeated.

As will be understood by those in the art, the voltage provided across the electrodes 16 and 18 of the airgap igniter will be relatively low with the control circuit 10. Provided a higher voltage across the electrodes 16 and 18 of the igniter 52 is desired, the circuit of FIG. 1 may be modified as illustrated in FIG. 2.

Figure 2:
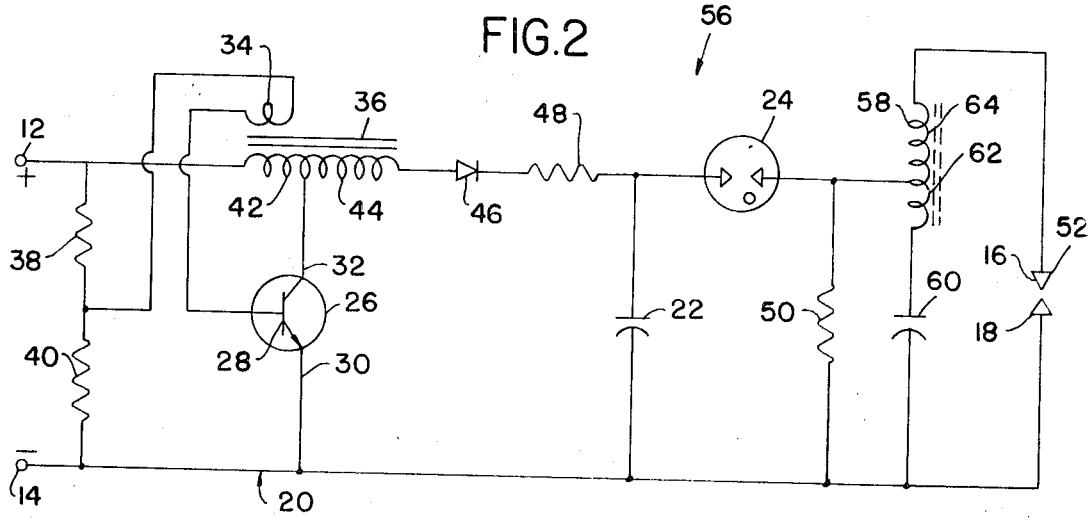
FIG. 2 is a modification of the electrical control circuit of FIG. 1.

The circuit 56 of FIG. 2 is exactly the same as the circuit 10 of FIG. 1, except for the inclusion therein of the discharge transformer 58 and additional capacitor 60. In addition, the resistor 54 of the airgap igniter is not shown since it is not essential in the operation of either circuit 10 or 56. The similar components in circuits 10 and 56 have been given the same reference characters.

In operation of the modified electronic control circuit 56, on breakdown of the spark gap 24, the capacitor 22 discharges through the primary portion 62 of the transformer 58 into the capacitor 60, whereby an electrical signal of increased voltage is provided across the electrodes 16 and 18 through the secondary portion 64 of the transformer 58.

Figure 3:
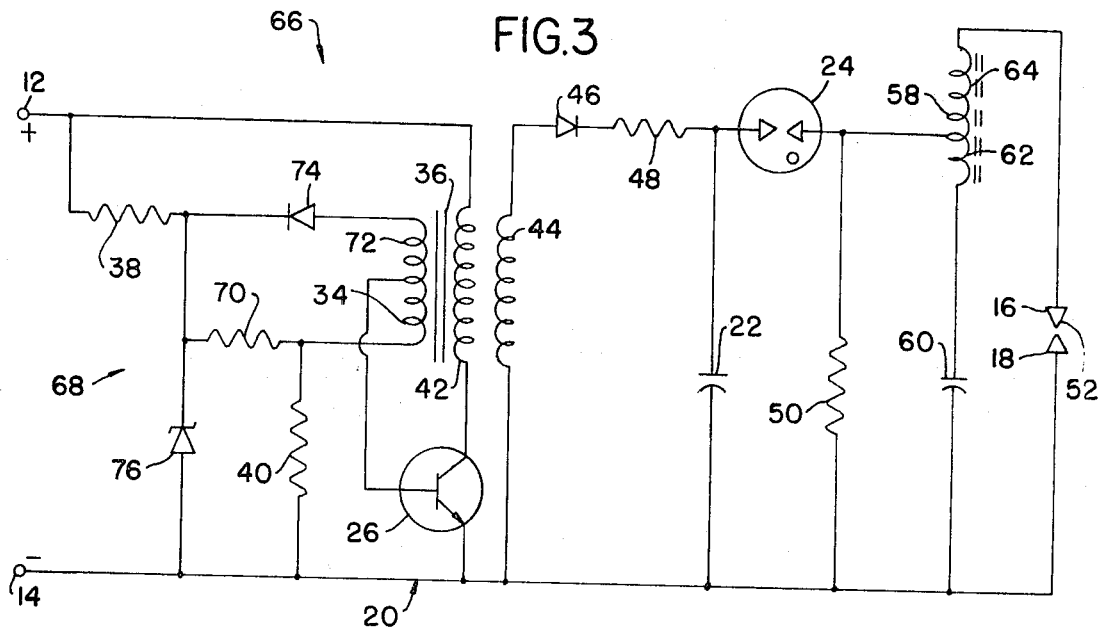
FIG. 3 is a modification of the electrical control circuit of FIG. 2.

With both the circuits 10 and 56 of FIGS. 1 and 2, the frequency of the output signal across the electrodes 16 and 18 will vary with the magnitude of the input electrical signal across the terminals 12 and 14 with the rest of the circuit constants identical. The modified electronic control circuit 66 illustrated in FIG. 3 is the same as the control circuit of FIG. 2, except for the regulating circuit 68 to provide a more uniform output frequency across the electrodes 16 and 18. Thus, the similar components have again been given similar reference characters in FIG. 3.

The regulating circuit 68, as shown in FIG. 3, includes an additional resistor 70 in the voltage divider circuit between the terminals 12 and 14 and between the resistors 38 and 40 which are connected thereto and the additional secondary portion 72 in the transformer 36, the diode 74 and the Zener diode 76. In addition, the secondary transformer portion 44 is separate from the primary portion 42 of the transformer 36.

With the regulating circuit 68 connected as shown in FIG. 3, the initial voltage applied to the oscillator transistor 26 is controlled by the Zener diode 76 maintaining a substantially constant voltage across the resistors 70 and 40. If, in the operation of the oscillator 26, the current through the primary portion 42 of the transformer 36 increases beyond a predetermined limit, the electrical signal developed in the secondary portion 72 of the transformer 36 will provide a current through the diode 74, Zener diode 76 and resistance 40 and the transformer secondary portion 34 in opposition to the current flow produced due to the source of electrical energy across the terminals 12 and 14 through the resistors 38, 70 and 40 to reduce the bias on the transistor 26 whereby the current flow is reduced to within the predetermined limits therefor.

Thus, it will be seen that with the regulating circuit 68 in the control circuit 66 of FIG. 3 a substantially constant signal is fed to the capacitor during each oscillation of the oscillator 26, whereby the charge is built up on capacitor 22 in a uniform manner and the frequency of discharge of the capacitor 22 is thus maintained substantially constant even though the input voltage across the terminals 12 and 14 may vary considerably.

Figure 4:
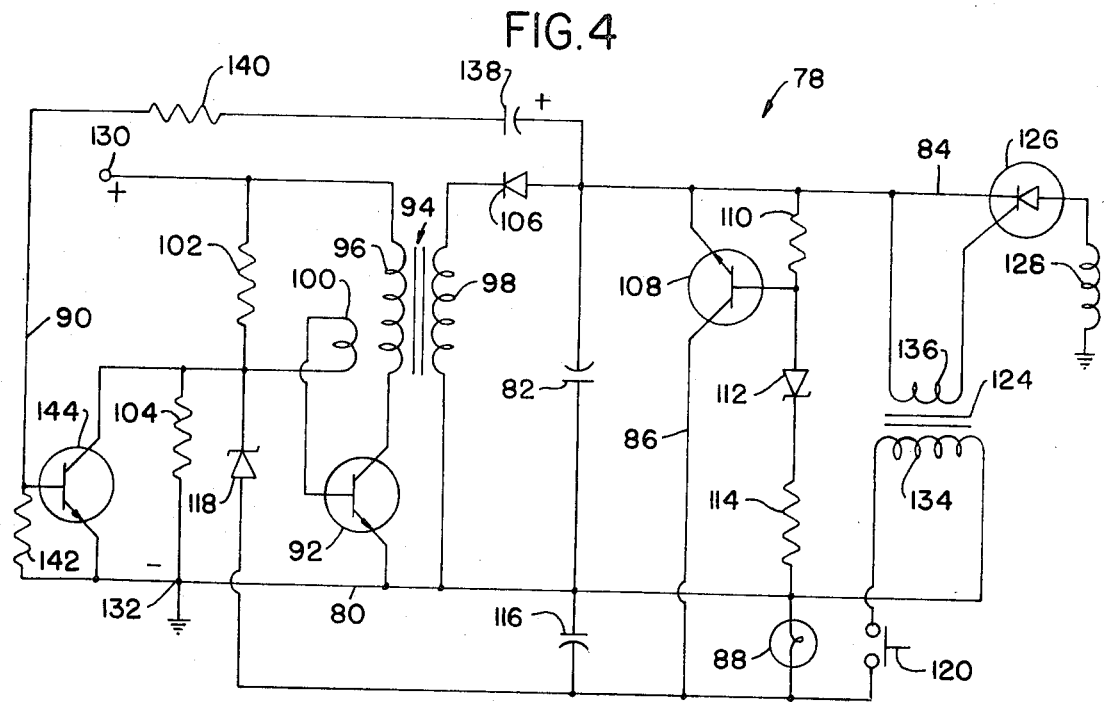
FIG. 4 is a schematic diagram of a second embodiment of the invention particularly suited for missile firing.

The embodiment 78 of the control circuit of the invention illustrated in FIG. 4 includes the oscillator circuit 80, a storage capacitor 82 and a trigger circuit 84 through which the capacitor 82 is discharged. The circuit 86 of the control circuit 78 is provided to maintain a predetermined charge on the capacitor 82 indicated by the light 88. The circuit 90 prevents operation of the oscillator circuit 80 during discharge of the capacitor 82 through the trigger circuit 84.

The oscillator circuit 80 again includes the oscillator transistor 92, transformer 94 having the primary winding 96 and the secondary windings 98 and 100, and the voltage divider including resistors 102 and 104. Operation of the oscillator circuit 80 is as considered in conjunction with control circuit 10. The capacitor 82 is again charged through a rectifying diode 106.

The circuit 86 for maintaining a predetermined charge on the capacitor 82 includes the transistor 108 connected to conduct in response to a bias applied thereto on current flow through the resistor 110. Current flows through the resistor 110 on conduction of the Zener diode 112 in series with the resistor 110 and resistor 114 across the capacitor 82. Resistors 110 and 114 are not essential. Circuit 86 further includes the light 88, capacitor 116 and Zener diode 118 connected as shown in FIG. 4.

In operation a voltage is applied across terminals 130 and 132, as before, to provide a bias for the oscillator transistor 92 across the resistor 104 of the voltage divider to cause the oscillator 92 to conduct through the transformer primary portion 96. Conduction of the oscillator transistor 92 will cause the transistor 92 to be cut off due to the signal in transformer secondary portion 100 and produce a signal in the secondary portion 98 of the transformer 94, whereby a signal is passed through the diode 106 to the capacitor 82 where it is stored as before.

The signal built up on the capacitor 82 over several cycles of the oscillator 92 will eventually reach a predetermined value which it is desired to maintain on the capacitor 82. At the upper limit of the desired voltage on the capacitor 82, say, for example, 120 volts, the Zener diode 112 will conduct to provide a forward bias on the transistor 108, whereby the transistor 108 conducts to start a discharge of the capacitor 82 and build up a voltage on the capacitor 116 as well as light the light 88 indicating the desired voltage on the capacitor 82.

At a predetermined level of charging of the capacitor 116, the Zener diode 118 will be caused to conduct so that the transistor 92 will be cut off preventing additional charging of the capacitor 82. When the charge has dissipated from the capacitor 82 to a lower limit of the desired voltage, which may, for example, be maintained within one-tenth of a percent of a desired voltage, it will render the Zener diode 112 nonconductive to remove the bias from the transistor 108 whereby the capacitor 116 will discharge slightly and the Zener diode 118 reestablishes to again permit oscillation of the oscillator 92 and rebuilding of the charge on the capacitor 82. The charge on the capacitor 116 may, for example, vary between −24 and −22 volts with a 36 volt input.

The above indicated operation will continue indefinitely to maintain the voltage on the capacitor 82 within the desired limits until the trigger switch 120 in the trigger circuit 84 is closed whereby a pulse of electrical energy is passed through the primary portion 134 of the transformer 124 to the secondary portion 136 thereof. A trigger pulse is thus provided on the trigger electrode of the silicon control rectifier 126 to cause the rectifier 126 to conduct and provide a discharge path for the capacitor 82 through the solenoid 128 or other load structure such as an ordinary electric dynamite cap. The solenoid 128 may be connected to fire a missile such as a grenade, or perform other functions as desired.

The circuit 90 which includes the capacitor 138, resistor 140 and resistor 142 in series therewith and the transistor 144 connected as shown in FIG. 4, will cause the oscillator 92 to cease oscillating during the discharge of the capacitor 82 and for a period thereafter sufficient for the silicon controlled rectifier 126 to fully turn off whereby the trigger 120 must be closed to provide each actuating impulse through the load 128.

Thus, in operation, the capacitor 138 will charge in the polarity shown during charging of the capacitor 82 to maintain the transistor 144 in an off condition. When the capacitor 82 discharges the left side of the capacitor 138 goes from approximately 120 volts positive to zero, for example, to provide a bias on the transistor 144 turning the transistor 144 on. With the transistor 144 turned on the base of transistor 92 will be substantially grounded to maintain the oscillator 80 in an off condition until the charge on the capacitor 138 is dissipated sufficiently to lower the bias on transistor 144 to the nonconducting level again.

Figure 5:
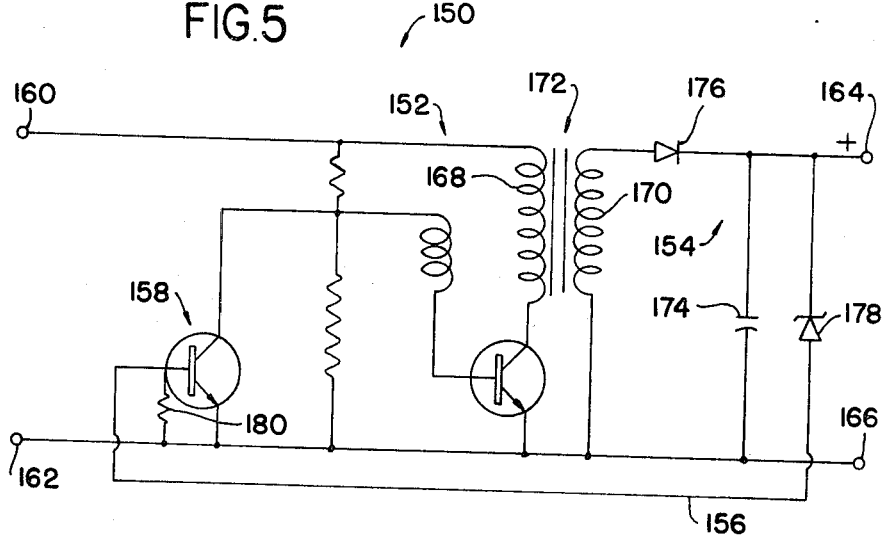
FIG. 5 is a schematic diagram of another embodiment of the invention particularly suited for providing a regulated, converted or inverted output at a chosen signal level with high efficiency over a range of input signals and loads.
Figure 6:
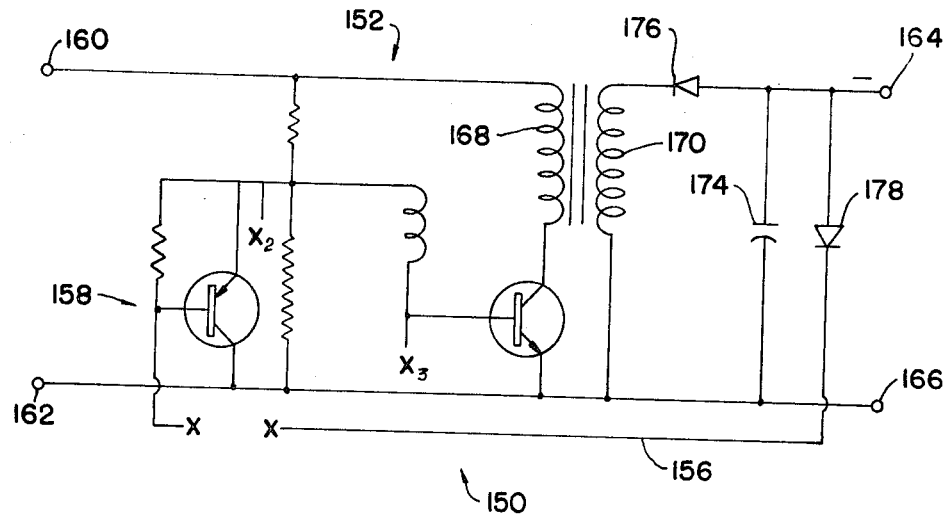
FIG. 6 is a modification of the circuit of FIG. 5.

The embodiment of the invention illustrated in FIGS. 5 and 6 is capable of receiving a direct or alternating current input signal over a wide range of supply voltage and providing a regulated output signal over a wide range of loads which output signal may be converted from alternating to direct current inverted in polarity and may higher or lower in signal strength than the input signal. Further, the transfer of the signal from the oscillator portion of circuit 150 to the storage portion of the circuit will be at a theoretical 100 percent efficiency.

The circuit 150 includes the oscillator circuit 152, the storage circuit 154, the regulating and feedback circuit 156 and the buffer circuit 158. The input which may be a direct current signal or an alternating current signal having a wide range of voltage is applied to the terminals 160 and 162 while the output signal will be taken across the terminals 164 and 166.

The oscillator circuit 152 is entirely similar to the oscillator circuit 20 in both construction and function and will not therefore be considered in detail, except to point out that the separation of the primary portion 168 and the secondary portion 170 of the transformer 172 will not affect the function of the oscillator.

The storage circuit 154 is again similar to that of the modification 10 of the invention and includes the storage capacitor 174 and the diode 176. With the diode 176 in the circuit in one direction, as shown in FIG. 5, the signal stored on the capacitor 174 due to the signal from the oscillator circuit 152 will have a positive polarity. With the diode 176 turned in the opposite direction, as shown in FIG. 6, the signal on the capacitor 174 will be inverted in polarity so as to be negative at terminal 164, as shown in FIG. 6.

The output from the capacitor 174 is continuous and is regulated by the Zener diode 178 positioned with the proper polarity in accordance with the polarity of the signal at the terminal 164, as shown in FIGS. 5 and 6. The signal across the Zener diode 178 is further used as a feedback signal through the circuit 156 and across the resistor 180, as shown in FIG. 5, to control the signal input to the oscillator 152.

To isolate the control of the oscillator from the effects of the load on the feedback signal through the Zener diode 178 the buffer circuit 158 is provided. It will be understood that the feedback signal from the Zener diode 178 may be connected to regulate the oscillator circuit in a number of different positions, as shown for example in FIG. 6, where conductor end X may be connected at $X_1$, $X_2$ or $X_3$. The buffer circuit 158 is of course not necessary.

Thus in overall operation of the embodiment 150 of the invention, an input signal is provided across the terminals 160 and 162 which may be either an alternating or direct current signal to produce a pulsating signal through the transformer primary winding 168 as before to induce a pulsating signal in the transformer secondary winding 170 on collapse of the field in the transformer primary winding 168. The signals from the transformer secondary winding 170 are passed through the diode 176 and stored on the capacitor 174. The signal on the capacitor 174 is drained from the capacitor 174 through the terminal 164 and is maintained at a substantially constant voltage by the Zener diode 178 in conjunction with the input signal to the capacitor 174. The signal through the Zener diode 178 is fed back to the oscillator circuit 152 to regulate the input signal thereto in accordance with the signal on the capacitor 174. As indicated above, the feedback signal may be passed through the buffer amplifier circuit 158 to isolate the oscillator from the effect of, for example a changing load.

While three embodiments of the present invention and modifications thereof have been considered in detail, it will be understood that other embodiments and modifications are contemplated by the inventor.

What I claim as my invention is:

1. A circuit for providing a controlled pulse of electrical energy comprising a source of electrical oscillations, electrical storage means, electrical reactance means for transferring electrical energy from the source of electrical oscillations into the storage means to provide an electrical signal therein, means connected between the storage means and source of electrical oscillations for maintaining the voltage of the electric signal in the storage means between predetermined limits comprising a semiconductor device including emitter, collector and base electrodes, a capacitor connected in series with the emitter and collector electrodes of the semiconductor device across the electrical storage means, resistance means and a voltage regulating device connected in series across the electrical storage means, said base of said semiconductor device being connected between the resistance means and voltage regulating device and a voltage regulating device connected at one end between the capacitor and the collector of the semiconductor device and connected at the other end to the source of electrical oscillations, and means for providing a controlled discharge of the electrical signal in the storage means across a load.

2. Structure as set forth in claim 1 and further including an indicator connected across the capacitor.

3. Structure as set forth in claim 1 wherein the means for providing a controlled discharge of the electrical signal in the storage means across a load comprises a silicon controlled rectifier having primary electrodes connected across the storage means and a control electrode, a transformer secondary winding connected between one of the primary electrodes and the control electrode of the silicon controlled rectifier and a switch and transformer primary winding connected across the capacitor and operably associated with the transformer secondary winding.

4. Structure as set forth in claim 1 and further including means for turning off the source of electrical oscillations during discharge of the storage means comprising a second semiconductor device having emitter, collector and base electrodes, the emitter and collector electrodes of which are connected in series to the source of electrical oscillations and a capacitor and voltage divider resistance connected in series with each other and across the storage means with the base of the second semiconductor device connected to a point on the voltage divider resistance.

5. A circuit for providing a controlled pulse of electrical energy comprising a source of electrical oscillations including a first transistor having emitter, base and collector electrodes, a primary transformer winding connected in series with the emitter and collector of the first transistor across a direct current power supply, a voltage divider resistor connected across the source of electrical energy and feedback coil connected to a point on the voltage divider resistor and to the base of the first transistor operably associated with the transformer primary winding, electrical storage means comprising a capacitor, electrical reactance means for transferring electrical energy from the source of electrical oscillations into the storage means to provide an electrical signal therein including a transformer secondary winding operably associated with the transformer primary winding and a diode in series with each other connected across the electrical storage means, means connected between the electrical storage means and the source of electrical oscillations for maintaining the voltage of the electric signal in the electrical storage means between predetermined limits comprising a second transistor having emitter, base and collector electrodes, a second capacitor connected in series with the emitter and collector of the second transistor across the electrical storage means, a resistor and Zener diode connected in series across the electrical storage means, the base of the second transistor being connected between the resistor and Zener diode and a second Zener diode connected between the capacitor and second transistor on one side and between the capacitor and second transistor on one side and between the voltage divider resistor and feedback winding of the source of electrical oscillations on the other side, means for indicating a voltage between the predetermined limits on the electrical storage means comprising a light connected across the second capacitor, means for providing a controlled discharge of the electrical signal in the electrical storage means across a load comprising s switch and second primary transformer winding connected across the second capacitor, a silicon controlled rectifier having two primary electrodes and a control electrode, the primary electrodes of which are connected in series with the load across the storage means, and a second secondary transformer winding operably associated with the second primary transformer winding connected between one of the primary electrodes and the control electrode of the silicon controlled rectifier.

6. Structure as set forth in claim 5 and further including means for turning off the source of electrical oscillations during discharge of the electrical storage means comprising a third transistor having emitter, base and collector electrodes, the emitter and collector electrodes of which are connected in series across the feedback winding and the emitter base circuit of the first transistor and a capacitor and second voltage divider resistor connected in series across the the storage means, the base of the third transistor being connected to a point on the second voltage divider resistor.

* * * * *